United States Patent [19]

Pressman et al.

[11] Patent Number: 5,555,483
[45] Date of Patent: Sep. 10, 1996

[54] AUTOMATIC POWER LINE MONITOR SYSTEM

[76] Inventors: Stanton L. Pressman, 7086 Dassett Ct., #201, Annandale, Va. 22033; Patrick C. Stuart, 101 Rainbow Dr. #1406, Livingston, Tex. 77351

[21] Appl. No.: 194,523

[22] Filed: Feb. 10, 1994

[51] Int. Cl.⁶ .................................................. H02H 3/24
[52] U.S. Cl. ........................... 361/90; 361/92; 340/661
[58] Field of Search ......................... 361/90, 91, 92; 340/641, 661, 662, 663

[56] References Cited

U.S. PATENT DOCUMENTS 4,999,730  3/1991  Pickard ........................ 361/90
5,367,424  1/1994  Even ............................ 361/90

*Primary Examiner*—Todd Deboer
*Attorney, Agent, or Firm*—Wigman, Cohen, Leitner & Myers, P.C.

[57] ABSTRACT

An automatic power line monitor system is disclosed for use in monitoring the electrical voltage supplied to an electrical system or appliance by monitoring the supplied electrical voltage and preventing the supplied electrical voltage from reaching the electrical system or appliance when the supplied electrical voltage is not within a predetermined range and for automatically restoring the supplied electrical voltage to the electrical system or appliance when the supplied electrical voltage is within the predetermined range.

18 Claims, 2 Drawing Sheets

AUTOMATIC POWER LINE MONITOR SYSTEM

BACKGROUND OF THE INVENTION

The present invention relates generally to the monitoring of the electrical voltage level available from power lines. More particularly, the present invention relates to a system for preventing electrical voltage from reaching an electrical system or appliance when the monitored electrical voltage is not within a predetermined range.

From time to time, the quality of electrical power provided to consumers by the local electric utility company varies from the 117 volts plus or minus 10% standard. For example, in order to cope with increased electrical loads during peak hours, such as, for example, in the evenings when electrical demand can be very high or during certain times of the year when there is a large demand for air conditioning or electrical heating, the voltage available to consumers can be reduced from the standard value. In particular, electric power utilities have been known to reduce the electrical voltage supplied to industrial users when they are experiencing high peak power usage.

Since most electrical systems and appliances designed for use in the United States are intended for use at the standard voltage of 117 volts, as the voltage varies from that value by more than the design standard deviation of 10%, damage to electrical appliances and systems, such as motors, condensers, microwave ovens and electrical appliances, can occur. In addition, for various reasons, electrical voltage spikes or surges are also unintentionally delivered to consumers. Such voltage spikes or surges can also damage or destroy electrical systems and consumer appliances, such as computers, stereos, microwave ovens, VCRs and the like by applying a voltage to those appliances which is higher than the appliance and/or the components of the appliance is designed to withstand.

One consumer area which is particularly sensitive to power voltage deviation conditions is that of recreational vehicle parks. Typically, such recreational vehicle parks provide spaces for parking recreational vehicles and trailers for a large number of users together with an electrical power outlet for each of the users. A similar set up is also utilized in marinas for boat owners.

Most recreational vehicle parks and marinas were built many years ago when users owned campers and small trailers (or small boats in the case of marinas). Since such recreational vehicle parks and marinas did not run at the same levels of capacity as today and the number of electrical systems and appliances used by such campers and small trailers or small boats was not as great as it is today, the electrical load when such recreational vehicle parks and marinas were designed was not as great as it is today. In addition, the electrical appliances and systems used today oftentimes contain complex electrical circuitry which requires greater voltage regulation.

Much of the time, the voltage provided to each of the users of these recreational vehicle parks and marinas is within the standard range of 117 volts plus or minus 10 percent. At certain times, such as during the peak hours of meal times or when heaters or air conditioners are being used, a great load is placed on the electrical power supply system. At those times, the voltage being supplied to each of the users can fall below that which is safe for use to properly operate recreational vehicle or boat appliances. In order to counter such an effect, some recreational vehicle parks and marinas will raise the voltage supplied to each of the spaces from its local transformer. When that happens and there is no load, that is, when very few recreational vehicles or boats are drawing electrical power, the voltage being supplied to each of the recreational vehicles may exceed the expected voltage range for which the recreational vehicle equipment was designed. In that case, severe damage to the electrical appliances in the recreational vehicle can result.

In order to try to prevent damage to electrical appliances in the recreational vehicles, many recreational vehicles have a voltmeter installed. However, in order to be effective, the voltmeter must be watched all of the time and then the user must take effective action to turn off the voltage being supplied to the recreational vehicle before damage to their electrical appliances, such as air conditioners, televisions, refrigerators, VCRs and converters, occurs. Such an approach is, however, totally unsatisfactory to users to implement.

Although the invention is described herein in connection with its use with recreational vehicles, it should be understood that its use is not to be limited to recreational vehicles and that it can be used to monitor electrical voltage applied to any load.

SUMMARY OF THE INVENTION

In view of the foregoing, it should be apparent that there still exists a need in the art for an apparatus for monitoring the electrical voltage supplied to a recreational vehicle such that it will not allow high or low voltages or voltage surges to enter the electrical system of a recreational vehicle and return the voltage to the recreational vehicle electrical system when the voltage has returned to the appropriate range. It is, therefore, a primary object of this invention to provide an apparatus for monitoring the electrical voltage supplied to a recreational vehicle and for preventing voltages below or above a certain predetermined range from reaching the electrical system of the recreational vehicle which is characterized by simple electronic circuitry and which is easy to install.

More particularly, it is an object of this invention to provide voltage monitoring and regulation for a recreational transportation device having its own on-board electrical system which utilizes simple and reliable electronic circuitry which does not require frequent alignment nor costly components.

Still more particularly, it is an object of this invention to provide a voltage monitoring and control system which monitors all phases of the multi-phase electrical power supplied to it and automatically prevents voltage from passing through it when the voltage becomes too high or too low compared to a predetermined range and allows the power to resume passing through it when the voltage returns to the desired range.

Briefly described, these and other objects of the invention are accomplished by electrical circuitry which provides a dual operational amplifier connected such that a different reference voltage signal is applied to each of the operational amplifiers. A first reference voltage signal acts as the high set point while the second reference voltage signal acts as the low set point. An input signal voltage which is directly linearly proportional to the actual alternating current rms voltage being supplied to the power line monitor is provided as an input signal voltage to the operational amplifier for comparison to the first and second reference signals. When the input voltage signal exceeds either the low or high reference points set by the first and second reference voltage signals, a relay is energized which functions to open a main power relay, thus preventing power from flowing to the recreational vehicle electrical system.

With these and other objects, advantages and features of the invention that may become hereinafter apparent, the nature of the invention may be more clearly understood by reference to the following detailed description of the invention, the appended claims and to the several drawings attached herein.

DETAILED DESCRIPTION OF THE PREFERRED EMBODIMENT

Figure 1:
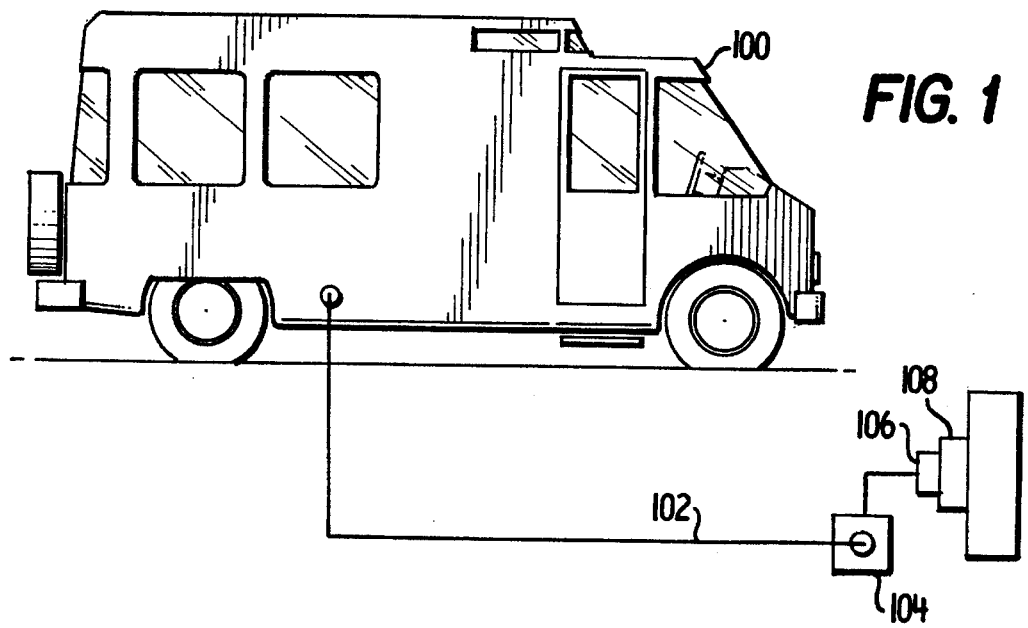
FIG. 1 is a drawing showing the typical use of the apparatus of the present invention in connection with a recreational vehicle.

Referring now in detail to the drawings wherein like parts are designated by like reference numerals throughout, there is illustrated in FIG. 1 a pictorial diagram of a recreational vehicle 100 connected by means of an electrical cord 102 to the power line monitor 104 of the present invention. The power line monitor 104 is connected, upon means of an appropriate connector 106 to the alternating current outlet 108 of, for instance, a recreational vehicle campground.

Figure 2:
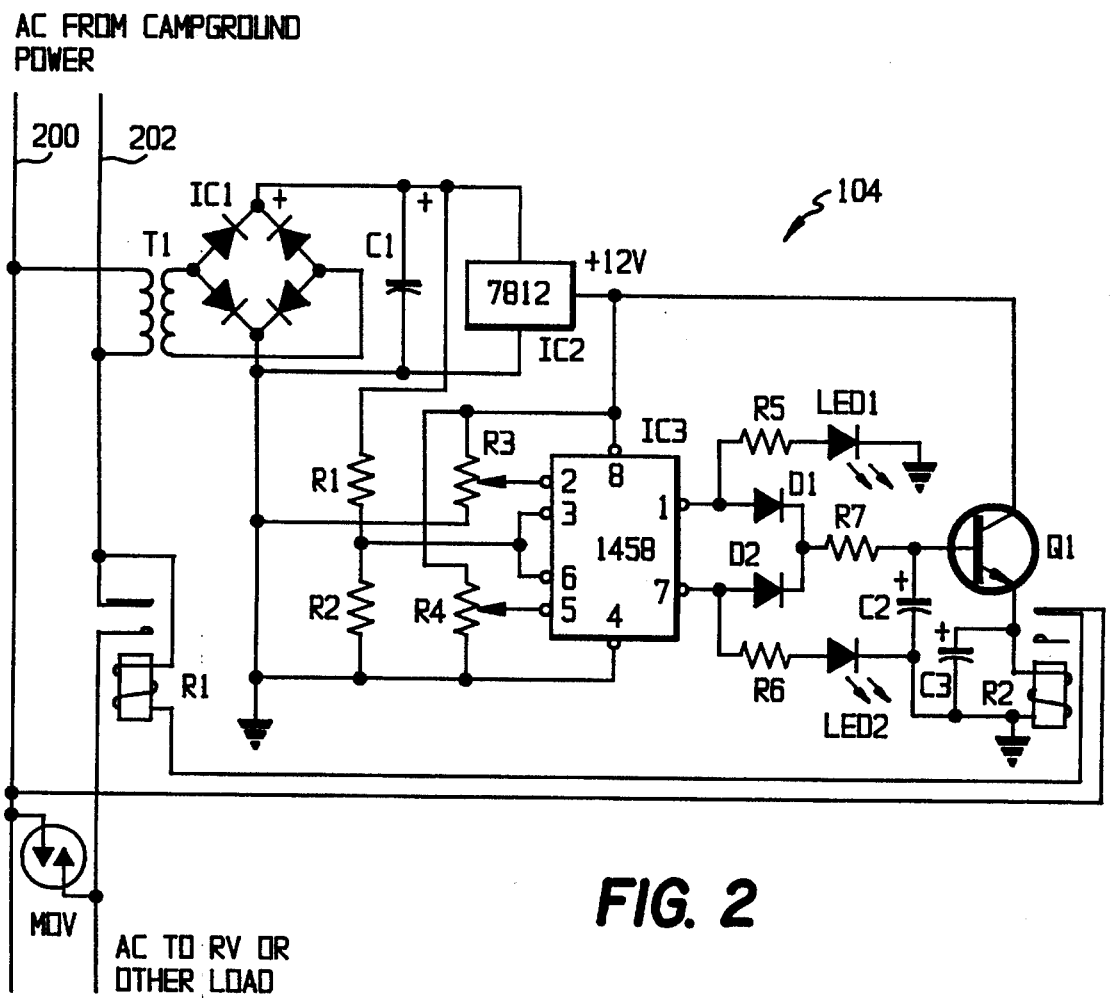
FIG. 2 is a block schematic diagram showing the circuitry of the apparatus of the present invention.

FIG. 2 is an electrical schematic diagram of the circuitry of a first embodiment of the power line monitor 104 of the present invention. As shown in FIG. 2, the power line monitor 104 is connected to the alternating current available from the campground by means of wires 200 and 202. A transformer T1 is connected across the AC wires 200 and 202 to convert the 120 volt, 60 hertz alternating current carried by those two wires 200, 202 to 12.6 volts at its output. The 12.6 volt power is fed to a full wave bridge rectifier IC1 which converts the AC voltage to a DC voltage. The output from the full wave bridge rectifier IC1 is fed to a 12 volt voltage regulator integrated circuit IC2, which may preferably be a model 78M12, available from Motorola of Schaumberg, Ill. A capacitor C1 is connected across the inputs to the voltage regulator IC2 in order to smooth ripples in the DC voltage produced by the full wave bridge rectifier IC1 and to boost the voltage to approximately 16–17 volts DC.

The 12 volts output by the voltage regulator IC2 is supplied as an input to the dual linear op amp integrated circuit IC3, which may preferably be a model MC1458P, available from Motorola or Texas Instruments. A voltage divider network is formed by the two resistors R1 and R2. The resistor R3 is connected between the 12 volt output of the voltage regulator IC2 and the connection of the voltage divider network formed by the resistors R1 and R2 in order to provide a high reference voltage to the integrated circuit I3. Typically, the value of the potentiometer R3 is adjusted such that it represents a high voltage reference of 129 volts.

The potentiometer R4 is connected between the 12 volt output of the voltage regulator IC2 and the end of the resistor R2 which is not connected to the resistor R1. The potentiator R4 is adjusted to provide the low reference voltage typically corresponding to a voltage of 105 volts.

Two diodes D1 and D2 are connected to the output pins of the dual op amp integrated circuit IC3 and the center point of those two diodes D1 and D2 is connected to a resistor R7 which is used to bias the base of a transistor Q1 which functions as the switch for closing the contacts of a relay R2 when a large enough voltage signal is present through either of the diodes D1 or D2. The closing of the relay R2 causes the relay R1 to open, thus breaking the path of the wire 202 to the recreational vehicle which therefore prevents alternating current from reaching the recreational vehicle.

Two LEDs, LED1 and LED2, are connected by means of resistors R5 and R6, respectively, to the output terminals of the op amp 1C3 to which the diodes D1 and D2 are respectively connected. The resistors R5 and R6 have high enough values to limit the voltage to the LEDs LED1 and LED2, but low enough values to allow those two LEDs to light dimly in order to provide an indication to the RV owner that the power line monitor system 104 is operating. The relay R2 has a capacitor C3 connected between one input of its coil and ground, in order to provide for positive latching of the coil of the relay R2.

Once the two potentiometers R3 and R4 have been properly adjusted, the relay R1 is closed when the power line monitor system 104 is energized and the AC voltage from the RV campground 108 is within the range of 105 to 129 volts. As explained above, under those same conditions, the relay R2 is deenergized.

As the AC line voltage increases across the wires 200 and 202, the secondary voltage output by the transformer T1 also increases. The increased voltage output by the secondary winding of the transformer T1 also increases the signal input voltage to the pins 3 and 6 of the dual op amp integrated circuit IC3. When the signal input voltage applied to the op amp circuit IC3 exceeds the high reference voltage supplied to pin 2 of that integrated circuit, the output of pin 1 of that integrated circuit IC3 goes to 7 volts. That level of voltage causes the LED1 to conduct after the voltage has been reduced to a usable level through the resistor R5. In addition, the same 7 volt output signal from pin 1 from the dual linear op amp IC3 charges the capacitor C2 through the resistor R7.

The diode D1 protects the dual op amp circuit IC3 from damage due to feedback voltage from downstream components. When the capacitor C2 is fully charged, the voltage from the resistor R7 biases the base of the transistor Q1, causing that transistor Q1 to conduct. Once the transistor Q1 conducts, it energizes the relay R2, which opens the contacts of the relay R1, thus deenergizing the power supplied to the recreational vehicle from the campground power by means of the wires 200 and 202.

As the high alternating current received from the campground power 108 begins to decrease, the signal input voltage through the transformer T1 and the full wave bridge rectifier IC1 to the dual linear op amp circuit IC3 also begins to decrease. When the signal input voltage drops below the high reference voltage, the output at pin 1 of the dual op amp circuit IC3 drops to about 1.5 volts and the LED1 stops conducting. The capacitor C2 then discharges over a period of approximately 4–5 seconds. When that discharge is complete, the transistor Q1 stops conducting and the relay R2 deenergizes, closing its contacts. When the contacts of the relay R2 are closed, the relay R1 is reenergized, which, in turn, allows the alternating current voltage from the campground power source 108 to reach the recreational vehicle or other load connected to the wires 200 and 202.

In the case where the voltage supplied by the campground begins to decrease, the voltage output by the secondary of the transformer T1 also decreases. That decrease in voltage causes the signal input voltage to pins 3 and 6 of the dual op amp integrated circuit IC3 to decrease. When the signal input voltage to the dual op amp circuit IC3 falls below the value of the low reference voltage applied to pin 5 of the dual op amp circuit IC3, the output at pin 7 of the dual op amp circuit goes to 7 volts.

The 7 volts output at pin 7 of the integrated circuit IC3 causes the LED2 to conduct again after the 7 volts has been reduced to a usable level by means of the resistor R6. The 7 volt signal output from pin 7 of the dual op amp circuit IC3 charges the capacitor C2 through the resistor R7. The diode D2, like the diode D1, serves to protect the dual op amp circuit IC3 from damage due to feedback voltage from the components downstream from the dual op amp integrated circuit IC3.

When the capacitor C2 is fully charged, the voltage through the resistor R7 biases the base of the transistor Q1, causing that transistor Q1 to conduct. Once the transistor Q1 conducts, it energizes the relay R2 which opens its contacts, causing the relay R1 to be deenergized, thus interrupting the power supplied to the recreational vehicle or other load through the wires 200 and 202.

As the AC voltage below 105 volts begins to increase, the signal input voltage supplied to pins 3 and 6 of the dual op amp circuit IC3 likewise increases. When the signal input voltage applied to the operational amplifier IC3 rises above the low reference voltage, the output of pin 7 of the integrated circuit IC3 drops to about 1.5 volts and the LED LED2 stops conducting. The capacitor C2 again discharges over a period of about 4–5 seconds. When the discharge of the capacitor C2 is complete, the transistor Q1 stops conducting and the relay R2 is deenergized. When the relay R2 is deenergized, its contacts close and allow the relay R1 to reenergize, which, in turn, allows power to flow from the campground power source 108 to the recreational vehicle or other load through the wires 200 and 202.

Figure 3:
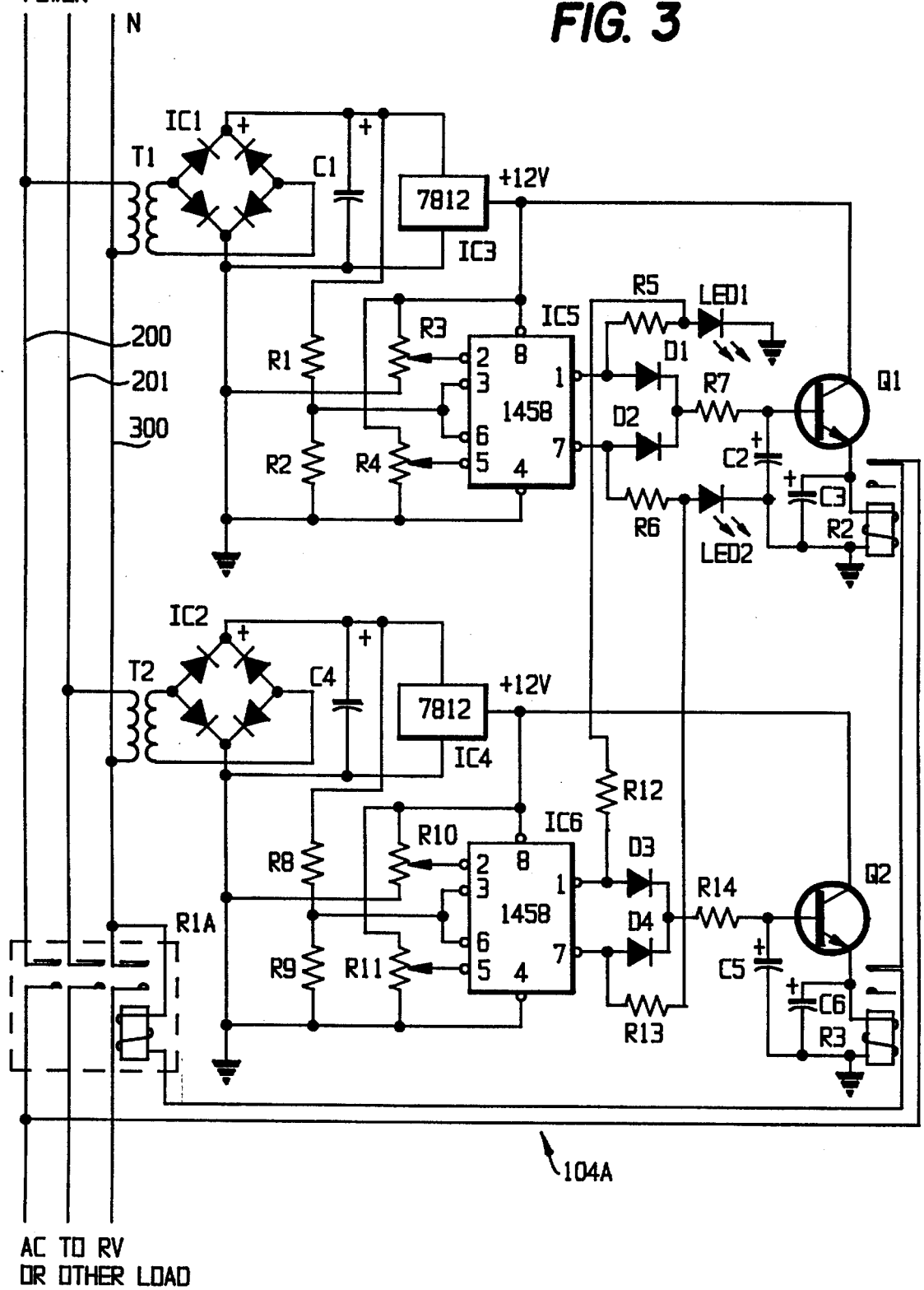
FIG. 3 is a schematic block diagram of the circuitry of an alternate embodiment of the apparatus of the present invention.

Turning now to FIG. 3, there is shown an alternate and preferred embodiment of the power line monitor 104A of the present invention which is suitable for use with 50 amp power generally supplied at recreational vehicle campgrounds. Such power is usually supplied from two separate power phases and thus the power line monitor 104A shown in FIG. 3 monitors both power lines for voltage deficiencies.

As shown in the electrical schematic diagram of the alternate preferred power line monitor 104A of FIG. 3, the two line multi-phase power line monitor 104A utilizes two dual operational amplifier integrated circuits IC5 and IC6. Each of the integrated circuits IC5 and IC6 is connected such that a separate reference signal is provided by means of the potentiometers R3 and R4 for the operational amplifier IC5 and potentiometers R10 and R11 for the operational amplifier IC6. The potentiometers R3 and R10 are used to provide the high set point reference voltage and the potentiometers R4 and R11 are used to provide the low set point reference voltage to their respect integrated circuits IC5 and IC6.

In a manner similar to that discussed above in connection with FIG. 2, an input signal voltage which varies proportionally with the output of the secondary of the transformers T1 and T2 is provided respectively to the dual op amp circuits IC5 and IC6. When the signal input to pins 3 and 6 of each of the respective operational amplifier circuits IC5 and IC6 exceeds either the high or the low reference points, a relay R2 or R3 is opened, using the same mechanism discussed above in connection with FIG. 2, which in turn opens the main power relay R1A.

The three-phase power line monitor 104A utilizes a first transformer T1 for monitoring the voltage between the first two-phase line 200 and the neutral line 300 while a second transformer T2 is utilized to monitor the voltage between the second power phase line 201 and the neutral line 300. The relay R1A completes each of the lines 200, 201 and 300 from the campground power to the recreational vehicle or other load. In the event of an over or under voltage condition, the continuity of each of the lines 200, 201 and 300 is broken by means the relay R1A.

In all other respects except for the following exceptions, the circuitry of FIG. 3 operates in the same manner as described above in connection with FIG. 2.

The first difference between the operation of the circuitry of FIG. 3 and that of the circuitry of FIG. 2 is that the LEDs LED 1 and LED2 of the power line monitor 104A of FIG. 3 are brightly lit when either of the dual operational amplifier integrated circuits IC5 or IC6 outputs a high or a low indication, respectively. The second exception to the operation of the three-phase power line monitor 104A is that the relays R2 and R3 are connected in series so that any signal input voltage on either of the two lines 200 and 201 which exceeds the high or low reference voltage set points for the integrated circuits IC5 and IC6 will cause power to be interrupted to the recreational vehicle or other load.

Although the power line monitor 104, 104A of the present invention has been described as a system which is added after the recreational vehicle has been manufactured, it should be understood that similar circuitry can be hot wired or built directly into a recreational vehicle or other vehicle such that it need not be added later on. In that event, a remote indicating panel containing the two LEDs, LED1 and LED2, is provided for mounting inside the recreational vehicle so that the operation of the power line monitor can be monitored. In all other respects, a hard wired power line monitor operates in exactly the same fashion as the power line monitor 104, 104A which is plugged into the campground power source 108 and to which the recreational vehicle 100 is then connected by means of a power line 102.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. A power line monitor system for use with a recreational vehicle for connecting the electrical system of such recreational vehicle to a source of electrical power, comprising:

means for connecting said power line monitor system to said source of electrical power;

means for connecting said electrical system of said recreational vehicle to said power line monitor system;

means for monitoring said source of electrical power to determine whether voltage supplied by said source of electrical power is within a predetermined voltage range;

means for indicating electrical power outside of said predetermined voltage range including a first indicating means connected to indicate a first condition wherein the voltage is higher than said predetermined voltage range and a second indicating means connected to indicate a second condition wherein the voltage is lower than said predetermined voltage range, wherein, during said first or second conditions, at least one of said indicating means are enabled prior to said interruption of said electrical system of said recreational vehicle and said indicating means are disabled prior to restoration of said connection of said recreational vehicle to said source of electrical power; and means for interrupting connection of the electrical system of said recreational vehicle to said source of electrical power while said voltage supplied by said source of electrical power is outside of said predetermined voltage range and for automatically restoring connection to said electrical system of said recreational vehicle when said voltage is within said predetermined voltage range, said means for interrupting including at least two relays wherein a first relay controls a second relay for interrupting and automatically restoring connection of said electrical power to said electrical system of said recreational vehicle.

2. The power line monitor system of claim 1, further including means for providing voltage surge protection for said electrical system of said recreational vehicle.

3. The power line monitor system of claim 1, wherein said means for monitoring comprises means connected to monitor each voltage phase of electrical power supplied by said source of electrical power such that said means for interrupting prevents electrical power from said source of electrical power from reaching said electrical system of said recreational vehicle while any voltage phase of said electrical power supplied by said source of electrical power is outside of said predetermined voltage range.

4. The power line monitor system of claim 1, wherein said source of electrical power is an electrical power outlet of one of a recreational vehicle campground and trailer park.

5. The power line monitor system of claim 4, wherein said means for monitoring said source of electrical power is situated adjacent to and removably connected with said electrical power outlet.

6. The power line monitor system of claim 1, wherein said means for monitoring said source of electrical power is permanently mounted to said recreational vehicle.

7. The power line monitor system of claim 1, wherein said means for interrupting connection of said electrical system of said recreational vehicle to said source of electrical power is contained within said power line monitor system.

8. A method for monitoring the value of the electrical voltage supplied to the electrical system of a transportation vehicle from an outside source of electrical power for preventing damage to the electrical system of the transportation vehicle, comprising the steps of:

connecting means for monitoring the value of the electrical voltage supplied to the electrical system of a transportation vehicle from said outside source of electrical power between said electrical system of said transportation vehicle and said outside source of electrical power;

monitoring the value of said electrical voltage supplied to the electrical system of said transportation vehicle by said outside source of electrical power to determine when said value is outside of a predetermined voltage range of values;

indicating when said electrical voltage is outside of said predetermined voltage range utilizing a first indicating means for indicating a first condition wherein the voltage is higher than said predetermined voltage range and a second indicating means for indicating a second condition wherein the voltage is lower than said predetermined voltage range, wherein, during said first or second conditions, at least one of said indicating means are enabled prior to preventing said electrical power from reaching the electrical system of said transportation vehicle and said indicating means are disabled prior to restoring said electrical power from said outside power source to said electrical system of said transportation vehicle; and preventing electrical power from said outside source of electrical power from reaching the electrical system of said transportation vehicle while said value of said electrical voltage supplied by said outside source of electrical power is outside of said predetermined voltage range and automatically restoring electrical power from said outside source of electrical power to said electrical system of said transportation vehicle when said value of said electrical voltage is within said predetermined voltage range, said step of preventing utilizing at least two relays, wherein a first relay controls a second relay for preventing and automatically restoring electrical power from said outside source of electrical power to said electrical system of said transportation vehicle.

9. The method of claim 8, wherein said step of monitoring includes monitoring each voltage phase of said electrical voltage supplied by said outside source of electrical power.

10. The method of claim 8, further including the step of providing voltage surge protection for said electrical system of said transportation vehicle.

11. The method of claim 8, wherein said transportation vehicle comprises a recreational vehicle and said outside source of electrical power is an electrical power outlet of one of a recreational vehicle campground and a trailer park.

12. The method of claim 8, wherein said means for monitoring the value of said electrical voltage supplied to said electrical system of said transportation vehicle is mounted in said transportation vehicle.

13. The method of claim 11, wherein said means for monitoring the value of said electrical voltage supplied to said electrical system of said transportation vehicle is connected to said electrical power outlet.

14. The method of claim 8, wherein said step of preventing electrical power from outside said outside source of electrical power from reaching the electrical system of said transportation vehicle is accomplished within said means for monitoring.

15. A power line monitor system for connection between an external source of electrical power and a load for monitoring the value of the voltage supplied by the external source of electrical power, comprising:

means for connecting said power line monitor system to said external source of electrical power;

means for connecting said load to said power line monitor system;

means for monitoring the voltage value of said external source of electrical power to determine whether voltage supplied by said external source of electrical power is within a predetermined voltage range;

means for indicating electrical power outside of said predetermined voltage range including first indicating means connected to indicate a first condition wherein the voltage is higher than said predetermined voltage range and a second indicating means connected to indicate a second condition wherein the voltage is lower than said predetermined voltage range, wherein, during said first or second conditions, at least one of said indicating means are enabled prior to said interruption of said source of electrical power to said load and said indicating means are disabled prior to restoration of said connection of said load to said source of electrical power; and means for interrupting connection of said load to said external source of electrical power while said voltage supplied by said external source of electrical power is outside of said predetermined voltage range and for automatically restoring connection of said load to said external source of electrical power when said voltage supplied by said external source of electrical power is within said predetermined voltage range, said means for interrupting including at least two relays wherein a first relay controls a second relay for interrupting and automatically restoring connection of said source of electrical power to said load.

16. The power line monitor system of claim 15, wherein said means for interrupting connection of said load to said external source of electrical power is contained within said power line monitor system.

17. The power line monitor system of claim 15, further including means for providing voltage surge protection for said load.

18. The power line monitor system of claim 15, wherein said means for monitoring comprises means connected to monitor each voltage phase of electrical power supplied by said external source of electrical power to said load such that said means for interrupting prevents electrical power from said external source of electrical power from reaching said load while any voltage phase of said external source of electrical power supplied to said load is outside of said predetermined voltage range.

* * * * *